United States Patent [19]

Coutu

[11] Patent Number: 5,264,770
[45] Date of Patent: Nov. 23, 1993

[54] STEPPER MOTOR DRIVER CIRCUIT

[76] Inventor: David J. Coutu, 85 N. Main St., Unit No. 53, East Hampton, Conn. 06424

[21] Appl. No.: 851,303

[22] Filed: Mar. 12, 1992

[51] Int. Cl.$^5$ ............................................. H02P 8/00
[52] U.S. Cl. ...................................... 318/696; 318/685
[58] Field of Search ................................ 318/685, 696

[56] References Cited

U.S. PATENT DOCUMENTS

| | | | |
|---|---|---|---|
| 4,164,697 | 8/1979 | Everett | 318/696 |
| 4,218,642 | 8/1980 | Johnson | 318/696 |
| 4,319,174 | 3/1982 | Cook et al. | 318/696 |
| 4,415,845 | 11/1983 | Oudet | 318/696 |
| 4,476,421 | 10/1984 | Moriguchi | 318/696 |
| 4,661,756 | 4/1987 | Murphy et al. | 318/685 |
| 4,703,243 | 10/1987 | Ettelman et al. | 318/696 |
| 4,904,917 | 2/1990 | Hakluytt | 318/696 |
| 5,032,781 | 7/1991 | Kronenberg | 318/696 |

Primary Examiner—William M. Shoop, Jr.
Assistant Examiner—Karen Masih

[57] ABSTRACT

Applying current to a pair of stepper motor windings on alternating phases of a common drive clock reduces cross-noise in the opposing winding due to current switching which could otherwise cause false triggering of the phase current drivers.

The positional accuracy of the motor is controlled by the selective removal of the current supplied to each motor winding. The falling phase current in one winding is precisely regulated by the time constant determined from the rising phase current phase in the other winding.

Closely monitoring and controlling the phase currents in each motor winding efficiently reduces motor resonance due to self-generation.

24 Claims, 4 Drawing Sheets

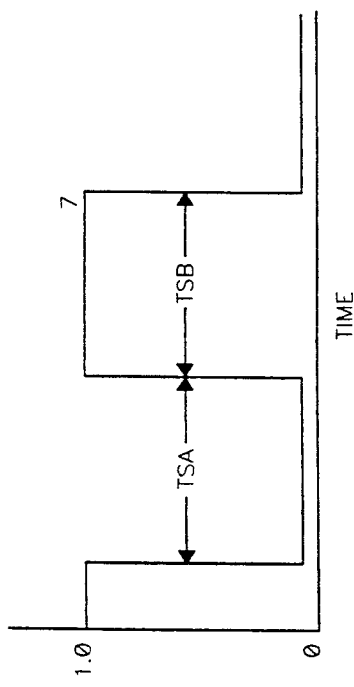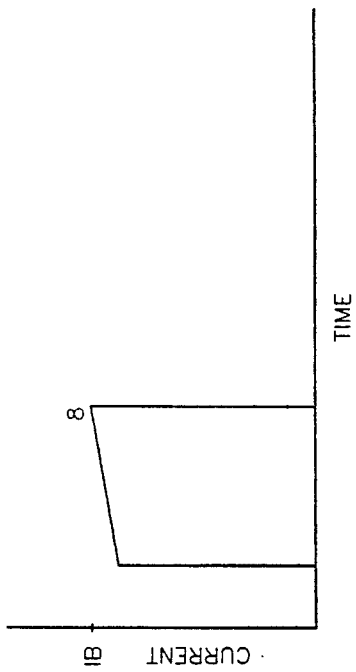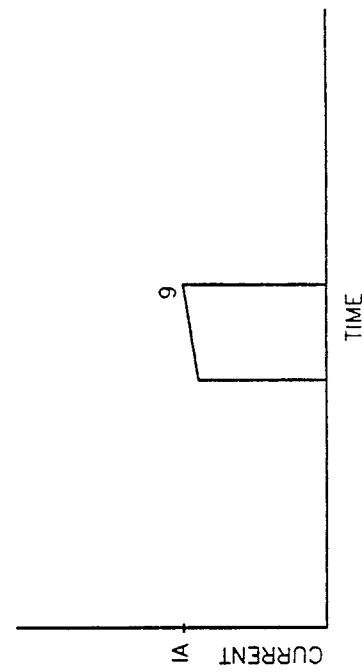

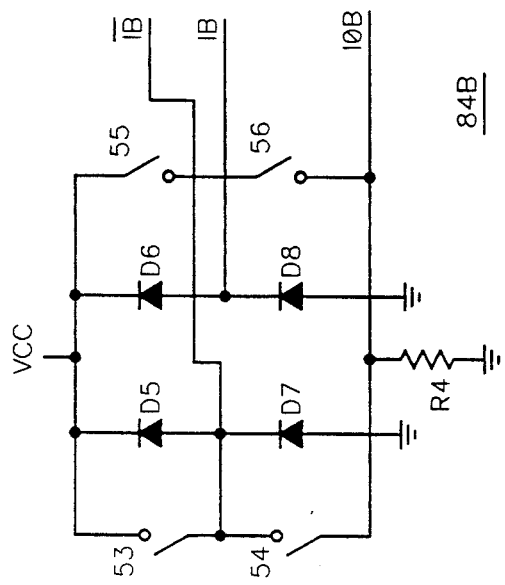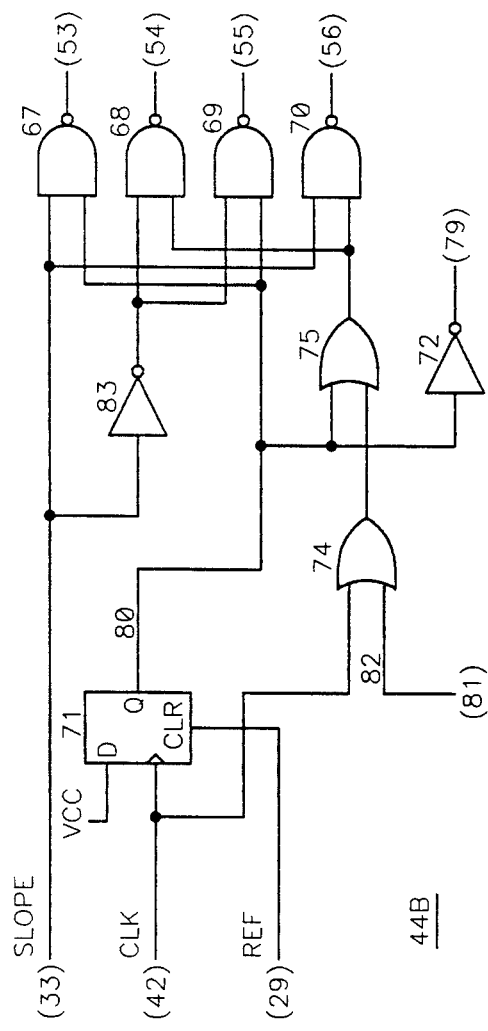
FIG 3B

STEPPER MOTOR DRIVER CIRCUIT

BACKGROUND OF THE INVENTION

Stepper motor drivers ordinarily provide a step clock of a fixed frequency to activate circuitry in the driver electronics to sample and apply current to the windings or "phases" of the associated stepper motor. The amount of current to be applied is a direct function of the desired position of the motor shaft. For rotational motion, current is applied to opposing windings in a stepper motor in a quadrature manner. In a micro-stepping driver, phase currents are applied as a Sine wave to one phase and a Cosine wave to the opposing phase with motor position defined at discrete points along the Sine and Cosine waveforms. Each pulse from an associated step clock, advances the motor to the next position, following the Sine and Cosine drive steps. For smooth motor rotation, the step clock is continuously applied at a fast rate, causing the motor to repetitively move through the micro-stepping sequence. To hold the motor at a fixed position, the motor driver must apply a constant current to each winding having a magnitude represented by the value of the Sine and Cosine waveform at the desired position.

Since the motor windings comprise a continuous coil of wire, they exhibit both inductive and resistive characteristics and an associated time constant related to the rise and decay of the applied current. To regulate current, stepper motor drivers periodically apply and remove voltage to the motor windings since the constant application of voltage would otherwise result in excessive power consumption. Since the applied current decays with time after voltage is removed, positional phase current is periodically recharged in each winding to hold the motor at a predetermined position. This is usually accomplished by switching a high voltage across each winding and allowing the current to increase until the motor reaches the predetermined value then rapidly switching off the voltage.

The fixed frequency motor driver clock as currently employed, provides gating to the motor driver electronics to apply and sample the phase currents in the windings and to determine whether the current has reached the desired value. When the driver circuitry is gated on to apply and sample the current in each winding, a reference value is generated from a D to A converter which produces the digital representation of the Sine or Cosine wave of the applied current and the actual phase current in each winding is then compared to the reference value.

When applying operating current to a motor winding on the rising waveform edge, a high voltage is applied across the winding until the phase current in the winding reaches the reference value.

On the falling edge of the current waveform, current must be removed from the winding in order to replicate the Sine or Cosine waveform in the downward direction. This is usually accomplished using either a so-called "fast" or "slow" decay method. In the "fast" decay approach, the winding is connected between ground and the applied voltage through a diode bridge. At the moment the upper and lower switches are turned OFF, the voltage across the winding is slightly greater than the applied voltage resulting in increased energy dissipation. The fast decay results from the winding inductance described earlier which sustains current flow-at the instant that the switch is opened. In the "slow" decay approach the high side switch is turned off so that the low side of the winding is slightly below ground and the high side of the winding is slightly above ground resulting in a low voltage drop across the winding which greatly reduces energy dissipation.

If a circuit is used which only provides a fast decay setting, too much ripple is produced in the driving current to the motor resulting in decreased efficiency. If a circuit is used which only provides a slow decay setting, efficiency is increased but not enough current is removed resulting in distorted motion and an increased possibility of creating resonance.

Prior Art circuits used for sampling and controlling phase current to stepper driver motor windings typically gate each phase current simultaneously and apply drive current to the motor windings in the manner described earlier. Since each phase current usually does not require the same on-time, a Sine wave and a Cosine wave applied to the opposing currents results in one phase current arriving at the desired value before the other. When the motor driver circuit respondingly switches the first phase current off, a resulting current spike is induced in the second phase current due to cross interference. If the induced current spike is of sufficient magnitude the second phase current is immediately turned off since the phase current that the circuit erroneously detects has reached the reference value.

Prior art circuits also provide for a fixed fast decay time when trying to remove current on the falling side of the waveform. With this fast decay time, ripple current is decreased and efficiency is increased. However, this method is usually accomplished by selecting a time constant for the fast decay time as a portion of the entire cycle. This time constant has to be varied as a function of motor winding resistance and inductance, and the voltage used to drive the coils.

Another disadvantage of using a fixed fast decay setting is that there is much more energy stored in the coils of the motor when it is near the peak of the waveform than at the zero crossing. With a fixed time constant there will be a larger amount of current removed from the top of the wave and very little at the zero crossing. This creates in a high ripple current near the peak of the waveform and not enough current being removed around the zero crossing resulting in poor control.

SUMMARY OF THE INVENTION

A motor driver circuit samples the current to each of the two windings in a two-phase stepper motor and alternately applies current to the windings in accordance with the alternate phases of the driver circuit clock to eliminate cross-interference between the windings. By selectively controlling the current to the two windings the rotational position of the motor is accurately controlled.

The time that is required to charge the winding that is increasing in current is short near the zero crossing. As the waveform of the charging current increases in magnitude the charging time also increases. This "on" time for the current to charge the winding varies as a function of the motor inductance and resistance and as a function of the driving voltage.

Each phase driver circuit is gated by the same clock 180° out of phase such that one winding is gated "on" and charging while the other winding is gated "off" and discharging. Since the current in one winding has a sine wave configuration and the current in the other winding has a cosine wave configuration, the current in one winding is always rising while the current in the opposite winding is falling.

By now using the charging "on" time for the rising waveform in one winding to set the time that the falling waveform in the other winding is in fast decay makes the associated driver circuit now independant of the motor characteristics and the driving voltage. This method automatically compensates for the motor characteristics by removing only the necessary amount of current in a fast decay mode. This increases the motor operating efficiency by keeping the motor current ripple to a minimum. By controlling fast and slow decay or current within one winding depending on the relationship of the current within the opposite winding, undesirable motor resonance is reduced and the positional accuracy of the motor is improved.

BRIEF DESCRIPTION OF THE DRAWINGS

FIG. 1A is a graphic representation of the ON and OFF states of the driver clock within the stepper motor driver circuit in accordance with the invention;

FIG. 1B is a graphic representation of the resulting driver current applied to one winding of a stepper motor controlled by the motor driver circuit of the invention;

FIG. 1C is a graphic representation of the resulting driver current applied to the other winding of the stepper motor controlled by the motor driver in accordance to the invention;

FIG. 3B is a diagrammatic representation of the internal circuits within the phase B drive circuit of FIG. 2.

DESCRIPTION OF THE PREFERRED EMBODIMENT

Figure 2:
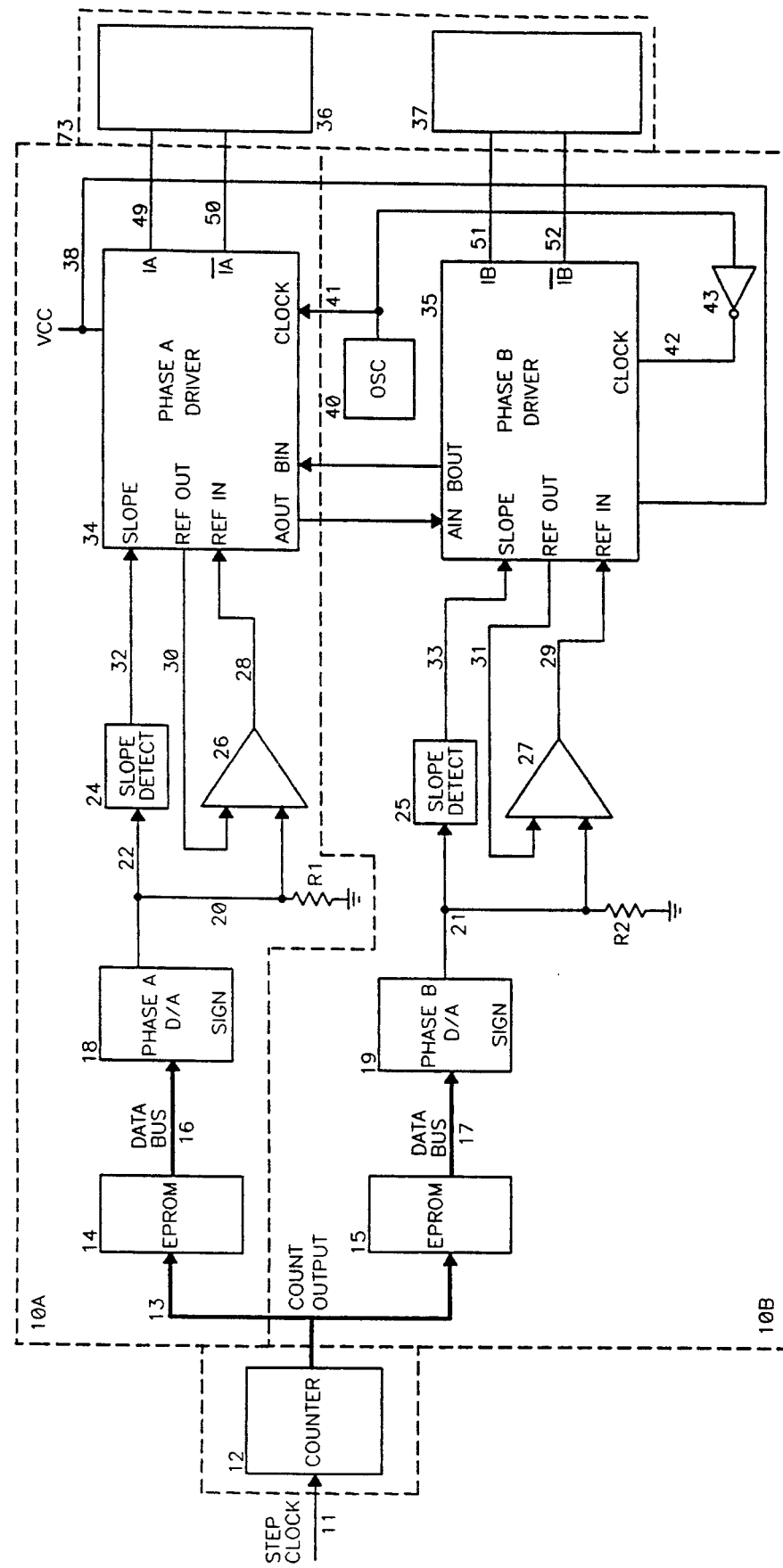
FIG. 2 is a diagrammatic representation of the motor driver circuit according to the invention.

As best seen by referring collectively to FIGS. 1A-1C and FIG. 2, a high frequency driver clock from an oscillator produces a gating pulse for separate phase A and phase B current pulses to the phase A and phase B windings of a stepper motor 73. As depicted at 7 in FIG. 1A, each phase current pulse responds to a half period of the driver clock frequency. Applying drive current to the phase A Winding 36, as shown at 8 in FIG. 1B, for the duration of the A phase half period of the driver clock and applying drive current to the phase B winding for the phase B half period of the driver clock as shown at 9 in FIG. 1C insures that the phase A winding and phase B winding are alternatively energized for optimum stepper motor operation without causing any induced spike current to occur in either winding.

As described earlier, the stepper motor drivers currently in use apply drive current to both the phase A winding and the phase B winding during the same period of the driver clock, whereby a current spike is induced in the phase A winding, for example, as soon as the phase B current is switched off. The induced current spike causes the phase A current to incorrectly switch off the phase A winding since the current spike momentarily exceeds the preset level for phase A current.

The selective application of current pulses to the phase A and phase B windings according to the invention is accomplished by means of the stepper motor driver circuit 10. A step clock pulse on line 11 is inputted to the CLK input of a binary counter 12 to advance the stepper motor one step. The resulting count is produced on bus 13 and inputs as an address to a pair of first and second EPROMS 14 and 15 within the corresponding driver subcircuit 10A for the phase A winding 36 and the corresponding driver subcircuit 10B for the phase B winding 37. The phase A subcircuit is driven to produce a Sine wave from the first EEPROM 14 and the phase B subcircuit is driven to produce a Cosine wave from the second EEPROM 15. Both first and second EPROMS contain digitized data representing a Sine wave and a Cosine wave output respectively.

The data for the digitized Sine and Cosine wave outputs for the selected positions of the stepper motor is output from the first and second EEPROMS over data busses 16 and 17 to corresponding D/A converters 18 and 19. The D/A converters generate output currents on lines 20 and 21 proportional to the input data from the EEPROMS. The output currents from the D/A converters passes through burden resistors $R_1$ and $R_2$ producing a reference voltage signal which corresponds to desired phase A and phase B currents.

The reference voltage is then compared to the currents in the corresponding phase A and phase B windings by means of comparators 26 and 27. The comparators connect with the phase A drive circuit 34 and the phase B drive circuit 35 over lines 30 and 31. The outputs of the comparators connect over lines 28 and 29 with the phase A and phase B drive circuits to indicate when the applied currents have reached their predetermined reference levels.

The slope detectors 24 and 25 monitor the reference voltage produced by the D/A converters to determine when the corresponding phase A current waveform and phase B current waveforms are falling or rising. The outputs of the slope detectors are inputted to the phase A and phase B drive circuits over lines 32 and 33. The phase A and phase B drive circuits connect with logic outputs from the associated pair of slope detectors 24, 25 over lines 32, 33 to determine when the associated phase A and phase B currents are rising or falling to implement the logic for the fast or slow decay selection in the manner described below.

An oscillator 40 produces the gating clock for the phase A and phase B drive circuits 34 and 35 to determine when the phase A and phase B currents are applied to the corresponding phase A and phase B windings. The oscillator 40 provides a square wave to the phase A drive circuit over line 41. Inverter 43 in turn provides an inverted square wave from the oscillator to the phase B drive circuit over line 42.

Figure 3A:
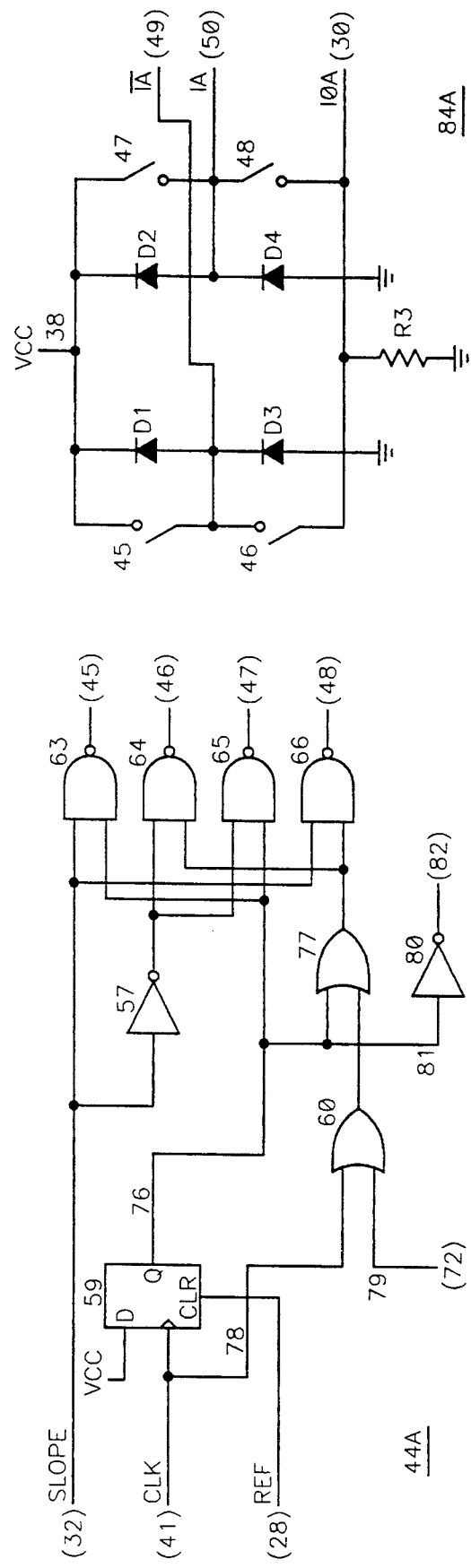
FIG. 3A is a diagrammatic representation of the internal circuits within the phase A drive circuit depicted in FIG. 2.

The operation of the phase A and phase B drive circuits to switch the drive voltage across the phase A winding 36 and phase B winding 37 is best seen by referring now to the detailed drive circuits 34, 35 depicted in FIGS. 3A, 3B, along with the driver circuit 10 of FIG. 2.

The logic subcircuit 44A controls the open and closed conditions of the electronic switches 45-48 within the associated switching subcircuit 84A and the logic subcircuit 44B controls the open and closed conditions of the electronically-controlled switches 53-56 within the associated switching subcircuit 84B. A logic "0" from NAND gates (63-70) causes the corresponding switches 45–48 bridged by diodes $D_1$–$D_4$ and corresponding switches 53–56 bridged by diodes $D_5$–$D_8$ to become CLOSED, and a logic "1" from the NAND gates causes the corresponding switches to be OPENED. During the positive cycle of the current waveform, the slope signal 32 is logic "1" and during the negative cycle the slope signal 32 is logic "0". The slope signal appearing at the slope input is applied to NAND gates 63, 65 and through inverter 57 to NAND gates 64, 66. The clock input from the gating oscillator 40 on line 41 provides a clock signal alternating between 1 and 0 with a 50 per cent duty cycle which is applied to a D-flip flop 59 to gate the phase A winding. The current in the phase A winding 36 generates a reference value across burden resistor R3 which is inputted to the comparator 26 over conductor 30 within the motor driver circuit 10 wherein it is compared to the reference value generated across burden resistor $R^1$. The output of the comparator is inputted to the REF terminal of subcircuit 44A over conductor 28. The REF input received over line 28 is logic "1" when the sensed current in the phase A winding develops a voltage across resistor R3 which is less than the reference value developed over $R_1$ and is logic "0" when the current in phase A winding is equal to or greater than the reference value across $R_1$. The REF input connects with the CLR terminal on flip flop 59 such that when the flip flop 59 is clocked ON an output logic "1" appears on conductor 76 when the phase A current is less than the reference value and an output logic "0" appears on conductor 76 when the reference value is reached. The output from flip flop 59 is directly applied to NAND gates 63 and 65 and is applied through an OR gate 77 to NAND gates 64 and 66. The OR gate 60 receives a clocking input over conductor 78 and a logic input over conductor 79.

The logic input to OR gate 60 is received from the $\overline{Q}$ output of the similar flip flop 71 within the logic subcircuit 44B of FIG. 3B over conductor 80 through inverter 72 which represents the complement of the phase B flip flop 71. A logic "1" appears on the output of OR gate 60 when either of the inputs to OR gate 60 is logic "1". The output from OR gate 60 is input to one input to OR gate 77 and the other input to OR gate 77 connects with the Q output of flip flop 59. When either input to OR gate 60 is logic "1", the drive circuit 34 is prevented from operating in the fast decay mode since either NAND gate 66 will close the associated electronically-controlled switch 48 within the switch subcircuit 84A or NAND gate 64 will close the associated switch 46 to establish a slow decay condition on the phase A winding which connects with the phase A drive circuit 34 by means of output terminals $I_{\overline{A}}$, $I_A$ and conductors 49, 50.

The drive circuit 35 for the controlling phase B winding 37 is shown in FIG. 3B and operates in a similar manner to the phase A drive circuit 34.

The phase B drive circuit 35 includes a similar logic subcircuit 44B and associated switching circuit 84B. The slope input to the drive circuit connects directly with NAND gates 67, 70 and with NAND gates 68, 69 through an inverter 83. The other input to NAND gate 67 connects with the other input to NAND gate 69 as well as with the Q output of the flip flop 71.

The other input to NAND gate 68 connects with the other input to NAND gate 70 as well as with the output of OR gate 75. The outputs of NAND gates 67–70 connect with and control the ON-OFF conditions of the associated electronically-controlled switches 53–56 within the associated switching subcircuit 84B. The clock input applied to the drive circuit 34 is simultaneously applied to the the drive circuit 35 through conductor 42 and inverter 43. The clock signal is also applied to one input to the OR gate 74 which is OR'ed with the Q output from the flip flop 59 within the drive circuit 34 over conductor 81 through an inverter 80 and conductor 82 within the drive circuit 35 in the same manner as described earlier for the drive circuit 34. The output of OR gate 74 is inputted to one input to OR gate 75 which connects with the Q output of the flip flop 71 and with one input to the OR gate 60 within drive circuit 34 through inverter 72 and conductor 80, as indicated. The current in the phase B winding 37 generates a reference value across burden resistor $R_4$ which is inputted to the comparator 27 over conductor 31 within the motor driver circuit 10 wherein it is compared to a reference value generated across burden resistor $R_2$. The output of the comparator is then inputted to the REF terminal over conductor 29 in the same manner as described earlier with reference to the drive circuit 34 of FIG. 3A. The output current from the switching subcircuit 84B is connected with the phase B winding 37 by means of the output terminals $I_B$, $I_{\overline{B}}$ and conductors 51, 52.

Having thus described our invention, what we claim as new and desire to secure by Letters Patent is:

1. A stepper motor drive circuit comprising:
   a binary counter having an input adapted for connection with a clock input and at least one output;
   a pair of first and second EPROMS connected with said binary counter output;
   a corresponding pair of first and second D/A converters connected with first and second data ports on said first and second EPROMS;
   a first slope detector having an input connecting with an output on first D/A converter, an input to a first comparator and a first reference current value;
   a second slope detector having an input connecting with an output on said second D/A converter, an input to a second comparator and a second reference current value;
   a first drive circuit connecting with an output on said first slope detector, an output on said first comparator and another input on said first comparator, said first drive circuit providing drive current to a first phase of a stepper motor;
   a second drive circuit connecting with an output on said second slope detector, an output on said second comparator and another input on said second comparator, said second drive circuit providing drive current to a second phase of a stepper motor, said first phase leading said second phase by a predetermined fraction of a cycle received from said first and second EPROM data ports;
   an output on said first drive circuit providing an indication to said second drive circuit when current is being applied to said first phase of a stepper motor;
   an output on said second drive circuit providing an indication to said first drive circuit when current is being applied to said second phase of said stepper motor.

2. The stepper motor driver circuit of claim 1 including an oscillator connecting between said first and second drive circuits, said oscillator providing a first clock input pulse to said first motor drive circuit and a second clock input pulse to said second drive circuit.

3. The stepper motor driver circuit of claim 2 wherein said oscillator connects with said second motor drive circuit through an inverter.

4. The stepper motor driver circuit of claim 1 wherein said first drive circuit comprises a first logic circuit and a first switching circuit.

5. The stepper motor circuit of claim 4 wherein said first logic circuit includes a first flip-flop and a pair of first interconnected OR-gates to provide a logic 0 or a logic 1 at an output of one of said first OR gates.

6. The stepper motor circuit of claim 5 wherein a clock input on said first flip-flop is connected with said oscillator and with an input on one of said first OR gates.

7. The stepper motor driver circuit of claim 6 including a plurality of first NAND gates having a plurality of interconnected first inputs, a first one of said NAND gate first inputs being connected with said output of said one first OR gate to thereby receive a logic 0 or a logic 1.

8. The stepper motor driver circuit of claim 7 wherein a second one of said NAND gate first inputs directly connects with said first slope detector circuit and a third one of said first NAND gate inputs connects with said slope detector circuit through an inverter.

9. The stepper motor driver circuit of claim 7 wherein a fourth one of said first NAND gate first inputs connects with an output of said first flip-flop and to another input on one of said first OR gates.

10. The stepper motor driver circuit of claim 9 including a plurality of electrically-operated first switches connected within said first switching circuit, a first pair of said first switches connected in series with each other and in parallel with a first pair of diodes.

11. The stepper motor driver circuit of claim 10 including a second pair of said first switches connected in series with each other and in parallel with a second pair of first diodes.

12. The stepper motor driver circuit of claim 11 wherein an output of each of said first NAND gates connects with a separate one of said plurality of said first switches to open or close said first switches upon occurrence of a logic 0 or logic 1 appearing on said outputs of said first NAND gates.

13. The stepper motor driver circuit of claim 1 wherein said second drive circuit comprises a second logic circuit and a second switching circuit.

14. The stepper motor circuit of claim 4 wherein said second logic circuit includes a second flip-flop and a pair of second OR-gates interconnected to provide a second logic 0 or a second logic 1 at an output of one of said second OR gates.

15. The stepper motor circuit of claim 5 wherein a clock input on said second flip-flop is connected with said oscillator and with an input on one of said second OR gates.

16. The stepper motor driver circuit of claim 6 including a plurality of second NAND gates having a plurality of interconnected first inputs, a first one of said second NAND gate first inputs being connected with said output of said one second OR gate to thereby receive a logic 0 or a logic 1.

17. The stepper motor driver circuit of claim 7 wherein a second one of said second NAND gate first inputs directly connects with said second slope detector circuit and a third one of said second NAND gate inputs connects with said slope detector circuit through an inverter.

18. The stepper motor driver circuit of claim 7 wherein a fourth one of said second NAND gate first inputs connects with an output of said second flip-flop and to another input on one of said second OR gates.

19. The stepper motor driver circuit of claim 9 including a plurality of electrically-operated second switches connected within said second switching circuit, a first pair of said second switches connected in series with each other and in parallel with a first pair of second diodes.

20. The stepper motor driver circuit of claim 10 including a second pair of said second switches connected in series with each other and in parallel with a second pair of second diodes.

21. The stepper motor driver circuit of claim 1; wherein an output of each of said second NAND gates connects with a separate one of said plurality of said second switches to open or close said second switches upon occurrence of a logic 0 or logic 1 appearing on said outputs of said first NAND gates.

22. A method for controlling the decay rate of charging current applied to a stepper motor comprising the steps of:
reducing charging current at a first rate to a first or second winding arranged within a stepper motor;
reducing charging current at a second rate to said first or second winding within said stepper motor, said second rate being slower than said first rate;
determining an ON time and an OFF time for providing a first charging current to said first winding;
determining an ON time and an OFF time for providing a second charging current to said second winding;
reducing said second charging current in said second winding at said first rate during said ON period of time for said first charging current; and
further reducing said second charging current in said second winding at said second rate during said OFF period of time for said first charging current;
reducing said first charging current in said first winding at said first rate during said ON period of time for said second charging current; and
further reducing said first charging current in said first winding at said second rate during said OFF period of time for said second charging current.

23. The method of claim 22 wherein said first current to said first winding comprises a rising wave form.

24. The method of claim 23 wherein said second current to said second winding comprises a falling wave form.

* * * * *